Figure 2:
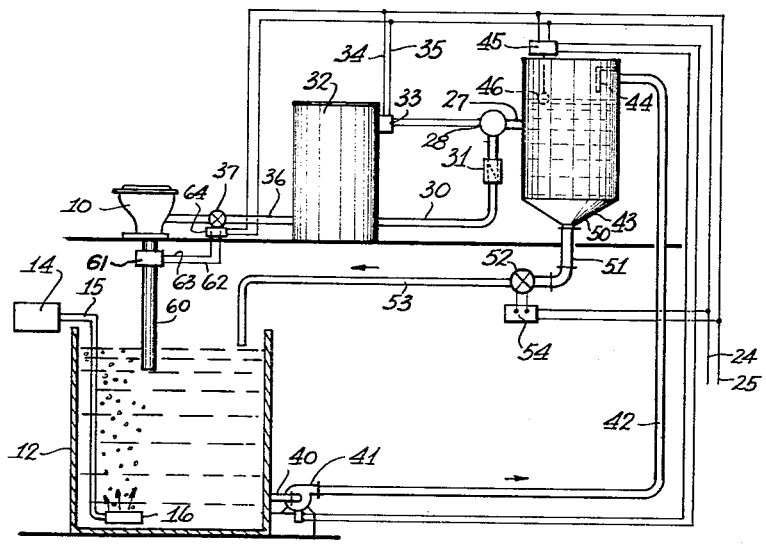

June 2, 1964     L. A. CAMPBELL ETAL     3,135,686

METHOD AND SYSTEM FOR THE TREATMENT OF SEWAGE

Filed Sept. 7, 1961

INVENTOR
Lorne A. Campbell
Duncan K. Smith
BY
Harold C. Weir
PATENT AGENT

United States Patent Office 3,135,686
Patented June 2, 1964

3,135,686
METHOD AND SYSTEM FOR THE TREATMENT
OF SEWAGE
Lorne A. Campbell and Duncan K. Smith, both of Toronto, Ontario, Canada, assignors to Central Mortgage and Housing Corporation, Ottawa, Ontario, Canada, a body corporate
Filed Sept. 7, 1961, Ser. No. 136,615
5 Claims. (Cl. 210—7)

This invention relates to the treatment of sewage, and in particular it relates to an improvement in the aerobic treatment of sewage especially useful in household sewage treatment units.

While the invention may be used in open or flow through sewage systems where the sewage is treated and an effluent discharged to a tile bed or similar disposal bed, it has particular value in a closed or recirculating sewage system where sewage is treated and a liquid recovered for subsequent use as a flushing and carrier liquid. As is well known, closed sewage treatment systems are desirable where disposal of an effluent presents a problem or where an abundant supply of water for flushing and as a carrier is not available.

In prior art sewage treatment systems using an aerobic process for treating sewage, the incoming sewage is passed to an aerating tank where it is aerated by continually bubbling air through it. The sewage is then transferred either to a separate settling tank or to a portion of the aerating tank designated for settling. In the settling area, a sludge settles mainly to the bottom of the tank with some floating to the surface. Sludge is continuously withdrawn from the bottom of the settling tank or from the bottom of the settling area of the aerating tank and returned for aeration with the incoming sewage. A supernatant liquid effluent is also withdrawn from the settling tank for subsequent discharge or for subsequent recirculation as a flushing and carrier liquid.

It has been found that the efficiency of prior art systems is impaired because the settling process is not complete or proceeds with interference. This is largely because the liquid in the aerating tank becomes supersaturated with respect to air. The bubbles of air coming out of the supersaturated liquid tend to support particles of sludge or waste and hinder settling. In a system which uses a separate settling tank, the continuous return of sludge from the bottom of the settling tank to the aerating tank maintains a degree of recirculation which hinders complete settling of the sludge. In a system which uses a portion of the aerating tank as a settling area there is usually a much greater degree of recirculation between aerating and settling areas which results in even poorer settling.

It is therefore an object of this invention to provide an improved method and system for the aerobic treatment of sewage.

It is another object of this invention to provide improved settling of sludge in aerobic treatment of sewage.

Figure 1:
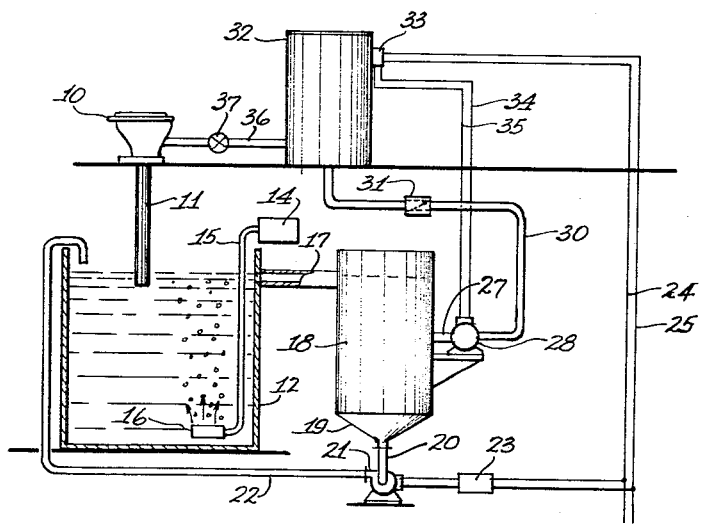
Figure 3:
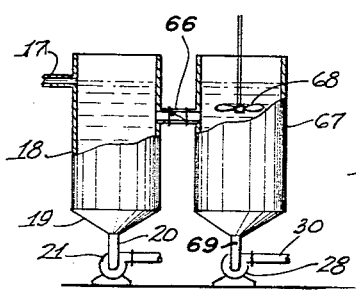

Further objects and advantages of this invention will appear from the following description taken in conjunction with the accompanying drawings in which:

FIGURE 1 is a schematic diagram of a sewage treatment system according to one form of the invention, FIGURE 2 is a schematic diagram of a sewage treatment system according to another form of the invention, and FIGURE 3 is a schematic diagram of apparatus that may be incorporated into either the diagrams of FIGURES 1 or 2.

Briefly, the present invention is for an improvement in the aerobic treatment of sewage which comprises aerating the sewage in an aerating area, transferring aerated sewage from the aerating area to a settling area, allowing particles of solids to settle from the liquid in the settling area as a sludge, returning substantially all the sludge and liquid in the settling area to the aerating area at periodically spaced intervals, and discharging supernatant liquid from the settling area.

Referring now to FIGURE 1, there is shown generally a schematic drawing of a closed sewage treatment system. A toilet bowl 10 is connected to a discharge conduit 11 for discharging waste and an aqueous carrier liquid downwards into an aerating tank 12. A comminuting device may be included in conduit 11 to comminute the waste and to mix the waste and the carrier liquid. Such a device is shown as included in the FIGURE 2 form of the invention. The comminution of the waste will aid in the subsequent decomposition of waste, however, it has been found that comminution is not necessary for the satisfactory operation of a household sewage treatment system according to the invention.

The lower end of conduit 11 is below the surface of the liquid in the aerating tank 12. An air pump or compressor is indicated in block form as 14 and is driven by a small motor (not shown). Air pump 14 is connected by a downwardly extending conduit or pipe 15 to an air diffuser 16 positioned near the bottom of aerating tank 12. The air diffuser 16 discharges bubbles of air continuously into the body of the liquid in tank 12 to promote the aerobic decomposition of waste therein. An overflow pipe (not shown) is provided in tank 12 to carry overflow liquid away from the closed system when necessary in a manner well known in the art.

An outlet conduit 17 is connected to an upper part of a wall in tank 12 and extends to a settling tank 18 having a bottom wall 19 preferably of a generally conical or funnel-like shape. The level of liquid in the system is such that there is gravity flow from the aerating tank 12 through conduit 17 to settling tank 18.

A centrally located outlet 20 is provided in the bottom 19 of settling tank 21, and is connected to the inlet of a centrifugal pump 21 which discharges through a conduit 22 back into aerating tank 12. The pump 21 is energized by power supplied through a time switch 23 from a power source 24, 25 as will be described in more detail hereinafter.

The settling tank 18 is provided with another outlet 27 in a side wall well above the bottom 19 and below the surface of the liquid in tank 18. The outlet 27 is connected to the inlet of a positive displacement pump 28, such as a gear or a jet pump, which discharges through a conduit 30 and a one way or non-return valve 31 into a reservoir tank 32. In FIGURE 1 the reservoir tank 32 is shown as a pressure tank which supplies a flushing and carrier liquid under pressure to bowl 10 for flushing. The use of a railroad or marine type toilet is preferred because much less liquid is required for flushing. This is a desirable feature in a closed system although it is of less importance in a flow through sewage treatment system because there is generally a larger aeration volume. The advantage of using less water in a closed system is that liquid circulates through the system more slowly and there is a longer hold-up period in the aeration tank. It is, nevertheless, possible to use the standard gravity type toilet and the reservoir tank 32 could alternately be positioned above the bowl 10 to supply the flushing and carrier liquid under a pressure created by a gravity head.

The pump 28 is energized by electrical power supplied from power source 24, 25 through a pressure responsive switch 33 on tank 32 and conductors 34, 35. The pressure switch 33 energizes pump 28 to pump liquid into tank 32 and maintain the pressure in reservoir tank 32 within predetermined limits as is well known in the art.

A conduit 36 is connected to reservoir tank 32 to provide an outlet from tank 32 to the toilet bowl 10. A flush valve 37 is located in conduit 36. The valve 37 is preferably a solenoid valve and is of the type that remains open for a predetermined time after actuation and then closes.

In the operation of the sewage treatment system of FIGURE 1, waste is flushed from bowl 10 by an aqueous carry liquid from the reservoir tank 32 through conduit 36. The waste and carrier liquid are discharged through conduit 11 into aerating tank 12. The liquid in the aerating tank 12 is aerated and circulated by the bubbles from diffuser 16. Liquid from the aerating tank 12 overflows by gravity to settling tank 18 through conduit 17 because of the rise in level of liquid in tank 12 due to the added waste and liquid. Particles of solids in the liquid in the settling tank settle as a sludge mainly to the bottom 19 of settling tank 18 with some floating to the surface. The outlet 27 from settling tank 18 is below the surface or floating sludge and above the bottom sludge. The flushing of the bowl 10 with liquid from tank 32 causes a drop in pressure in the reservoir tank 32 which actuates pressure responsive switch 33, energizing pump 28. The pump 28 pumps supernatant liquid from the settling tank through conduit 30 and valve 31 to reservoir tank 32 thereby restoring the pressure in tank 32. The switch 33 then shuts off pump 28.

The time switch 23 is adapted to close periodically to energize pump 21 to pump the liquid and sludge from the settling tank 18 back to the aerating tank 12. The pump 21 must have sufficient capacity to be able to substantially empty the settling tank 18, that is it must pump the contents of tank 18 to tank 12 in a relatively short time. In other words the gravity flow through conduit 17 must be much less than the rate of discharge of the pump 21.

It is convenient to have the time switch 23 energize pump 21 once every 24 hours preferably in the early hours of the morning when the system is not in use, that is, when new waste is not being discharged into aerating tank 12.

In a system having a number of toilets connected to it and having relatively large aerating and settling tanks, a pump of a capacity sufficient to transfer substantially all the contents of the settling tank to the aerating tank in a short period of time may be excessively expensive. The form of the invention shown in FIGURE 2 does not require such a pump.

Referring now to FIGURE 2, it will be seen that the aerating tank 12, air pump 14, conduit 15 and air diffuser 16 are the same as in the FIGURE 1 embodiment, and provide for aeration of the liquid in aerating tank 12. An outlet conduit 40 is provided in a side wall of tank 12 and is connected to an inlet of centrifugal pump 41 which discharges through a conduit 42 into a settling tank 43. The settling tank 43 is positioned at a level above that of aerating tank 12. The liquid being discharged from the conduit 42 into settling tank 43 impinges on a baffle 44 above the level of liquid in the settling tank. The baffle 44 serves a dual purpose. It serves to dislodge bubbles of air which might be entrained on particles of sludge, and it aids in breaking the supersaturation of the liquid with air. Both these, if not counteracted, tend to cause more sludge than necessary to float rather than sink and hinder good settling.

The pump 41 is energized by power received through conductors 47, 48 from a float control switch 45 actuated by float 46. The switch 45 controls pump 41 to maintain the level of liquid in the settling tank within predetermined limits.

As before, the settling tank 43 has a funnel-like bottom wall 50 provided with a centrally located outlet 51 connecting with a valve 52 which controls flow through conduit 53 back to the aerating tank 12. Valve 52 is conveniently an electrically operated valve which is actuated by power received via time switch 54 from power source 24, 25. Thus at certain predetermined periodic times the time switch 54 energizes valve 52 to open it for a predetermined interval and then close it.

Settling tank 43 is provided with another outlet 27 which serves the same purpose as in the FIGURE 1 embodiment. Also, as in FIGURE 1, a positive displacement pump 28, one way valve 31 and conduit 30 serve to pump liquid into and maintain a suitable pressure in reservoir tank 32. Flushing and carrier liquid is discharged from tank 32 through a conduit 36 and flush valve 37 (which may be a solenoid valve) to the bowl 10 to carry waste out of the bowl. The waste from the bowl may be discharged directly from bowl 10 through a discharge conduit 60, or a comminuting device 61 may be included to comminute the discharged waste and intimately mix the comminuted waste with carrier liquid. The comminuting device 61 may be energized by electrical power supplied through conductors 62, 63 from switch 64, which in turn is connected to power source 24, 25. Switch 64 is actuated by flush valve 37 so that comminuting device 61 is operating while flushing liquid is being discharged into bowl 10.

The operation of the sewage treatment system of FIGURE 2 is very similar to that of FIGURE 1. The waste and aqueous carrier liquid are aerated in tank 12. Pump 41 pumps aerated liquid through conduit 42 and discharges it into settling tank 43 against baffle 44. Float control switch 45 maintains the level in settling tank 43 within predetermined limits. When flushing valve 37 is operated and liquid discharged from pressure tank 32, pressure falls and the pressure responsive switch 33 energizes pump 28 to replenish tank 32. Time switch 52 operates at periodically spaced intervals to open and close valve 52 which rapidly discharges substantially all the contents of settling tank 43 through conduit 53 to aerating tank 12. The time switch 54 is conveniently set to operate once every 24 hours when there is no new waste entering the system.

It is sometimes desirable to add a relay operated switch between the pressure responsive switch 33 and the pump 28 and have this relay energized by switch 45 to open the circuit and prevent operation of pump 28 when the level in the settling tank 43 is low. Thus, when the level in the settling tank 43 is low and switch 45 energizes the pump 41 to increase the level in tank 43, the switch 45 will also energize the relay that opens the circuit to pump 28. This will eliminate the possibility of pump 28 pumping air into tank 32.

In both the FIGURE 1 and the FIGURE 2 forms of the invention the contents of the settling tank is relatively quiescent for long periods because of the periodic return of sludge and liquid from settling tank to aerating tank. The long quiescent periods permit improved separation of liquids and solids to take place and thus provide a more efficient operation.

In the closed sewage treatment systems as shown in FIGURES 1 and 2, the flushing liquid or supernatant liquid taken from the settling tank for storage in the reservoir tank may contain some dissolved colouring matter which is not desirable. The liquid may be passed through a filter containing, for example, activated carbon, to remove the colouring. FIGURE 3 shows a suitable apparatus for this.

In FIGURE 3 the settling tank 18 is the same as in FIGURE 1. The outlet in the side of settling tank 18 used for discharge of supernatant liquid is a conduit containing a one way valve 66 which permits the flow of liquid to a mixing tank or filter tank 67. This tank 67 contains activated carbon which is mixed with the liquid in the tank by a mixing device 68. The liquid in tank 67 is filtered as it passes to an outlet 69 and thence to pump 28 as in FIGURE 1.

While the drawings show closed sewage treatment systems, it is possible to use the present invention in an open or flow through system. In a flow through system flushing and carrier liquid is supplied from an external source and effluent from the settling tank is discharged to a tile bed or to a holding tank which collects effluent until a predetermined amount is accumulated and then discharges to a tile bed. In other words, in a flow through system, the outlet 27 from the settling tank would discharge into a tile bed or into a holding tank. Such a flow through system would, of course, incorporate the periodic return of sludge and liquid from the settling tank of the aerating tank as previously described.

It will be apparent that if circumstances require it, more than one aerating tank may be used with the aerating tanks connected in series.

It is believed that the present invention will provide for improved settling in the aerobic treatment of sewage and consequently improved operation of a sewage treatment system.

We claim:

1. A method for the treatment of sewage comprising the steps of discharging waste and an aqueous carrier liquid into an aerating area, aerating the discharged liquid in said aerating area to aerobically decompose waste therein, transferring liquid from said aerating area to a settling area, allowing particles of solids to settle downwards and float upwards in the liquid in said settling area as a sludge, returning substantially all the sludge and liquid in said settling area to said aerating area at periodically spaced intervals, and discharging supernatant liquid from said settling area at times other than said intervals.

2. A method for the treatment of sewage comprising the steps of comminuting waste and discharging comminuted waste and an aqueous carrier liquid into an aerating area, aerating the discharged liquid in said aerating area to aerobically decompose waste therein, transferring liquid from said aerating area to a settling area, allowing particles of solids to settle downwards and float upwards in the liquid in said settling area as a sludge, pumping substantially all the sludge and liquid in said settling area to said aerating area at periodically spaced intervals when waste is not being discharged into said aerating area, and discharging supernatant liquid from said settling area at times other than said intervals.

3. A sewage treatment system comprising a waste receiving toilet bowl, a liquid containing reservoir tank, a first conduit having an inlet in said reservoir tank and an outlet discharging into said toilet bowl, a flush valve in said first conduit having an open position permitting liquid flow therethrough to flush said bowl and a closed position preventing flow, an aerating tank, a second conduit having an inlet communicating with said bowl and a waste discharge outlet in said aerating tank, air supply means having an outlet in said aerating tank positioned adjacent the bottom thereof continuously to supply air to said aerating tank for aerobic waste decomposition, a settling tank adjacent said aerating tank, a third conduit interconnecting said aerating tank and said settling tank adjacent to tops thereof for gravitational flow therethrough, means for transferring substantially the entire contents of said settling tank to said aerating tank comprising a fourth conduit having an inlet connected to the bottom of said settling tank and an outlet discharging into said aerating tank, a first pump in said fourth conduit, and electrical timing means energizing said first pump at periodically spaced intervals, a fifth conduit having a supernating liquid receiving inlet in said settling tank and an outlet in said reservoir tank, a second pump located in said fifth conduit, a one way valve in said fifth conduit between said pump and said reservoir tank to permit flow therethrough in a direction towards said reservoir tank, and electrical means including a pressure responsive electrical switch in said reservoir tank energizing said second pump in response to pressure in said reservoir tank below a predetermined minimum to effect a transfer of supernatant liquid to said reservoir tank.

4. A sewage treatment system comprising a toilet bowl, a liquid containing reservoir tank, a first conduit having an inlet in said reservoir tank and an outlet discharging into said bowl, a flush valve in said first conduit having an open position permitting liquid flow therethrough to flush said bowl and a closed position preventing flow, an aerating tank, a second conduit having an inlet connecting with said toilet bowl and a waste discharge outlet in said aerating tank, a comminuting device in said second conduit, means simultaneously energizing said comminuting device and opening said flush valve, air supply means having an outlet in said aerating tank positioned adjacent the bottom thereof continuously to supply air to said aerating tank for aerobic waste decomposition, a settling tank located at a level above said aerating tank and having a funnel-like bottom provided with a central opening, means for maintaining a predetermined liquid level in said settling tank comprising a third conduit having an inlet in said aerating tank and an outlet into said settling tank adjacent the top thereof, a first pump located in said third conduit for pumping liquid from said aerating tank through said third conduit to said settling tank, and a level responsive switch means in said settling tank, energizing said first pump in response to level in said settling tank below a predetermined minimum, a fourth conduit having an inlet connected to the central opening in the funnel-like bottom of said settling tank and an outlet discharging into said aerating tank, a control valve in said fourth conduit, timing means opening said control valve for a predetermined time and closing said control valve after a predetermined interval, said timing means operating at periodically spaced times when new waste is not being discharged into said aerating tank for substantially complete transfer of the contents of said settling tank to said aerating tank, a fifth conduit having a supernating receiving inlet in said settling tank between said bottom of said settling tank and an outlet in said reservoir tank, a second pump located in said fifth conduit, a one way valve in said fifth conduit between said pump and said reservoir tank to permit flow therethrough in a direction towards said reservoir tank, and electrical means including a pressure responsive electrical switch in said reservoir tank energizing said second pump in response to pressure in said reservoir tank below a predetermined minimum to effect a transfer of supernatant liquid to said reservoir tank.

5. A sewage treatment system comprising an aerating sewage receiving tank, air supply means having an aerating outlet adjacent the bottom of said aerating tank, a settling tank, a first conduit having an inlet in said aerating tank and an outlet in said settling tank for aerated sewage transfer therethrough, a second conduit having an inlet connected to the bottom of said settling tank and a discharge outlet in said aerating tank, flow control means in said second conduit, means periodically energizing said flow control means at spaced intervals for substantially completely emptying said settling tank by transfer of the contents of said settling tank to said aerating tank, and a supernantant discharge outlet in said settling tank.

(References on following page)

References Cited in the file of this patent

UNITED STATES PATENTS

| | | |
|---|---|---|
| 2,678,915 | Kalinske | May 18, 1954 |
| 2,709,680 | Watson | May 31, 1955 |
| 2,777,816 | Schumacker | Jan. 15, 1957 |
| 2,798,228 | Boester | July 9, 1957 |
| 2,987,186 | Burgoon et al. | June 6, 1961 |
| 3,056,742 | Beaumont | Oct. 2, 1962 |

OTHER REFERENCES

"Treatment of Petrochemical Wastes by Superactivated Sludge Process, Strong et al., Ind. & Eng. Chem., vol. 46, February 1954, pages 308–316. (Copy in Pat. Off. Sci. Lib.)

"Total Oxidation of Organic Wastes," Tapleshay, Sewage and Industrial Wastes, vol. 30, May 1958, pages 652–661. (Copy in Patent Office Scientific Library.)

"Metabolic Energy Balances in a Total Oxidation Activated Sludge System," Kountz et al., Sewage and Ind. Wastes, vol. 31, July 1959, pages 819–826. (Copy in Patent Office Scientific Library.)

UNITED STATES PATENT OFFICE
CERTIFICATE OF CORRECTION

Patent No. 3,135,686            June 2, 1964

Lorne A. Campbell et al.

It is hereby certified that error appears in the above numbered patent requiring correction and that the said Letters Patent should read as corrected below.

In the grant, lines 2 and 3 and line 13, and in the heading to the printed specification, lines 5 and 6, name of assignee, for "Control Mortgage and Housing Corporation", each occurrence, read -- Central Mortgage and Housing Corporation --.

Signed and sealed this 9th day of February 1965.

(SEAL)
Attest:

ERNEST W. SWIDER
Attesting Officer

EDWARD J. BRENNER
Commissioner of Patents